US009218727B2

(12) United States Patent
Rothkopf et al.

(10) Patent No.: US 9,218,727 B2
(45) Date of Patent: Dec. 22, 2015

(54) VIBRATION IN PORTABLE DEVICES

(75) Inventors: Fletcher Rothkopf, Los Altos, CA (US); Teodor Dabov, San Francisco, CA (US); Stephen Brian Lynch, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 1013 days.

(21) Appl. No.: 13/106,491

(22) Filed: May 12, 2011

(65) Prior Publication Data

US 2012/0286943 A1 Nov. 15, 2012

(51) Int. Cl.
*G08B 6/00* (2006.01)
*G06F 19/00* (2011.01)

(52) U.S. Cl.
CPC ........................................ *G08B 6/00* (2013.01)

(58) Field of Classification Search
CPC combination set(s) only.
See application file for complete search history.

(56) References Cited

U.S. PATENT DOCUMENTS 5,293,161 A 3/1994 MacDonald et al.
5,434,549 A 7/1995 Hirabayashi et al.
5,436,622 A 7/1995 Gutman et al.
5,739,759 A 4/1998 Nakazawa et al.
6,342,880 B2 1/2002 Rosenberg et al.
6,373,465 B2 4/2002 Jolly et al.
6,438,393 B1 8/2002 Suuronen
6,493,612 B1 * 12/2002 Bisset et al. .................... 701/23
6,693,622 B1 2/2004 Shahoian et al.
6,864,877 B2 3/2005 Braun et al.
6,952,203 B2 10/2005 Banerjee et al.
6,988,414 B2 1/2006 Ruhrig et al.
7,130,664 B1 10/2006 Williams
7,234,379 B2 * 6/2007 Claesson et al. ............... 82/1.11
7,253,350 B2 8/2007 Noro et al.
7,323,959 B2 1/2008 Naka et al.
7,392,066 B2 6/2008 Hapamas
7,423,631 B2 9/2008 Shahoian et al.
7,508,382 B2 3/2009 Denoue et al.
7,570,254 B2 8/2009 Suzuki et al.
7,656,388 B2 2/2010 Schena et al.
7,675,414 B2 3/2010 Ray
7,710,399 B2 5/2010 Bruneau et al.
7,741,938 B2 6/2010 Kramlich
7,798,982 B2 9/2010 Zets et al.

(Continued)

FOREIGN PATENT DOCUMENTS

CN 101036105 9/2007
CN 101409164 4/2009

(Continued)

OTHER PUBLICATIONS

JP 2004-129120 (Japanese to English machine translation of document).*

(Continued)

*Primary Examiner* — Brian Zimmerman
*Assistant Examiner* — Cal Eustaquio
(74) *Attorney, Agent, or Firm* — Brownstein Hyatt Farber Schreck, LLP

(57) ABSTRACT

One embodiment may take the form of a method of reducing noise from vibration of a device on a hard surface. The method includes activating a haptic device to indicate an alert and sensing an audible level during activation of the haptic device. Additionally, the method includes determining if the audible level exceeds a threshold and initiating mitigation routines to reduce the audible level to a level below the threshold if the threshold is exceeded.

14 Claims, 8 Drawing Sheets

(56) References Cited

U.S. PATENT DOCUMENTS

| | | | | |
|---|---|---|---|---|
| 7,825,903 | B2 | 11/2010 | Anastas et al. | |
| 7,855,657 | B2 | 12/2010 | Doemens et al. | |
| 7,890,863 | B2 | 2/2011 | Grant et al. | |
| 7,904,210 | B2 * | 3/2011 | Pfau et al. | 700/280 |
| 7,919,945 | B2 | 4/2011 | Houston et al. | |
| 7,952,261 | B2 | 5/2011 | Lipton et al. | |
| 7,952,566 | B2 | 5/2011 | Poupyrev et al. | |
| 7,956,770 | B2 | 6/2011 | Klinghult et al. | |
| 8,002,089 | B2 | 8/2011 | Jasso et al. | |
| 8,040,224 | B2 | 10/2011 | Hwang | |
| 8,081,156 | B2 | 12/2011 | Ruettiger | |
| 8,125,453 | B2 | 2/2012 | Shahoian et al. | |
| 8,154,537 | B2 | 4/2012 | Olien et al. | |
| 8,169,402 | B2 | 5/2012 | Shahoian et al. | |
| 8,174,495 | B2 | 5/2012 | Takashima et al. | |
| 8,217,892 | B2 | 7/2012 | Meadors | |
| 8,232,494 | B2 | 7/2012 | Purcocks | |
| 8,248,386 | B2 | 8/2012 | Harrison | |
| 8,262,480 | B2 | 9/2012 | Cohen et al. | |
| 8,344,834 | B2 | 1/2013 | Niiyama | |
| 8,378,797 | B2 | 2/2013 | Pance et al. | |
| 8,378,965 | B2 | 2/2013 | Gregorio et al. | |
| 8,384,316 | B2 | 2/2013 | Houston et al. | |
| 8,390,218 | B2 | 3/2013 | Houston et al. | |
| 8,390,594 | B2 | 3/2013 | Modarres et al. | |
| 8,469,806 | B2 | 6/2013 | Grant et al. | |
| 8,471,690 | B2 | 6/2013 | Hennig et al. | |
| 8,493,177 | B2 | 7/2013 | Flaherty et al. | |
| 8,493,189 | B2 | 7/2013 | Suzuki | |
| 8,598,750 | B2 | 12/2013 | Park | |
| 8,619,031 | B2 | 12/2013 | Hayward | |
| 8,639,485 | B2 | 1/2014 | Connacher et al. | |
| 8,717,151 | B2 | 5/2014 | Forutanpour et al. | |
| 8,730,182 | B2 | 5/2014 | Modarres et al. | |
| 8,749,495 | B2 | 6/2014 | Grant et al. | |
| 8,797,153 | B2 | 8/2014 | Vanhelle et al. | |
| 8,872,448 | B2 | 10/2014 | Boldyrev et al. | |
| 9,086,727 | B2 | 7/2015 | Tidemand et al. | |
| 2005/0036603 | A1 * | 2/2005 | Hughes | 379/372 |
| 2005/0230594 | A1 | 10/2005 | Sato et al. | |
| 2006/0114110 | A1 * | 6/2006 | Girshovich et al. | 340/568.3 |
| 2006/0209037 | A1 | 9/2006 | Wang et al. | |
| 2006/0223547 | A1 | 10/2006 | Chin et al. | |
| 2006/0252463 | A1 | 11/2006 | Liao | |
| 2007/0106457 | A1 | 5/2007 | Rosenberg | |
| 2007/0152974 | A1 | 7/2007 | Kim et al. | |
| 2008/0084384 | A1 | 4/2008 | Gregorio et al. | |
| 2008/0158149 | A1 | 7/2008 | Levin | |
| 2009/0085879 | A1 | 4/2009 | Dai et al. | |
| 2009/0115734 | A1 | 5/2009 | Fredriksson et al. | |
| 2009/0167542 | A1 | 7/2009 | Culbert et al. | |
| 2009/0167702 | A1 | 7/2009 | Nurmi | |
| 2009/0174672 | A1 | 7/2009 | Schmidt | |
| 2009/0225046 | A1 | 9/2009 | Kim et al. | |
| 2009/0267892 | A1 | 10/2009 | Faubert | |
| 2009/0267920 | A1 | 10/2009 | Faubert et al. | |
| 2009/0313542 | A1 | 12/2009 | Cruz-Hernandez et al. | |
| 2010/0048256 | A1 | 2/2010 | Huppi et al. | |
| 2010/0056953 | A1 | 3/2010 | Couvillon | |
| 2010/0225600 | A1 | 9/2010 | Dai et al. | |
| 2010/0267424 | A1 | 10/2010 | Kim et al. | |
| 2010/0328229 | A1 | 12/2010 | Weber et al. | |
| 2011/0128239 | A1 | 6/2011 | Polyakov et al. | |
| 2011/0132114 | A1 | 6/2011 | Siotis | |
| 2011/0163946 | A1 | 7/2011 | Tartz et al. | |
| 2011/0205038 | A1 | 8/2011 | Drouin et al. | |
| 2011/0210834 | A1 | 9/2011 | Pasquero et al. | |
| 2011/0210926 | A1 | 9/2011 | Pasquero et al. | |
| 2012/0032906 | A1 | 2/2012 | Lemmens et al. | |
| 2012/0062491 | A1 | 3/2012 | Coni et al. | |
| 2012/0096351 | A1 | 4/2012 | Shahoian et al. | |
| 2012/0127071 | A1 | 5/2012 | Jitkoff et al. | |
| 2012/0223824 | A1 | 9/2012 | Rothkopf | |
| 2012/0319827 | A1 | 12/2012 | Pance et al. | |
| 2013/0002341 | A1 | 1/2013 | Maier et al. | |
| 2013/0044049 | A1 | 2/2013 | Biggs et al. | |
| 2013/0207793 | A1 | 8/2013 | Weaber et al. | |
| 2013/0253818 | A1 | 9/2013 | Sanders et al. | |
| 2013/0278401 | A1 | 10/2013 | Flaherty et al. | |
| 2014/0002386 | A1 | 1/2014 | Rosenberg et al. | |
| 2014/0028573 | A1 | 1/2014 | Olien et al. | |

FOREIGN PATENT DOCUMENTS

| | | | | |
|---|---|---|---|---|
| CN | 101663104 | | | 3/2010 |
| EP | 1686776 | | | 8/2006 |
| JP | 2004129120 | A | * | 4/2004 |
| JP | 2004236202 | | | 8/2004 |
| JP | 2010537279 | | | 12/2010 |
| JP | 2010540320 | | | 12/2010 |
| KR | 20050033909 | | | 4/2005 |
| TW | 2010035805 | | | 10/2010 |
| WO | WO02/073587 | | | 9/2002 |
| WO | WO2006/091494 | | | 8/2006 |
| WO | WO2007/114631 | | | 10/2007 |
| WO | WO2009/038862 | | | 3/2009 |
| WO | WO2014/066516 | | | 5/2014 |

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

* cited by examiner

VIBRATION IN PORTABLE DEVICES

TECHNICAL FIELD

The present disclosure is generally related to portable electronic devices and, more specifically, to portable electronic devices implementing haptic alerts.

BACKGROUND

Portable electronic devices such as mobile phones, media players, smart phones, and the like often provide "silent alerts" that are designed to catch a user's attention without providing an audible signal from a speaker. Frequently, the silent alert is set by the user when an audible alert would be disruptive, such as in a meeting or a theater, for example. The silent alert allows for the user to receive notification of some event, such as in incoming call or text, for example, discretely. Some users may even use the silent alert as their default notification mechanism.

Typically, the silent alert is provided by a haptic device, such as a vibrating device, intended to allow the user to feel the activation of the alert. There are two common vibrating devices that are currently implemented. One includes an eccentric weight coupled to a motor driven shaft that, when rotated, provides vibration. Another includes a linear vibrator that rather than having rotational movement, displaces in a linear path. The two types of vibrators present separate issues.

With regard to the rotating eccentric weight vibrator, the silent alerts are not so silent in some instances. Specifically, for example, when a mobile phone is set to actuate a silent alert while it is in contact with a hard surface (e.g., on a table or a shelf, or in a drawer), the rotating eccentric weight may cause the mobile phone to vibrate and rattle against the surface. In some cases, the noise caused by the rattling exceeds that of audible alerts and may be much more disruptive. Further, the mobile phone may move along the surface when the vibrating device is activated, thus placing the mobile phone at risk of falling.

The linear vibrator may similarly exhibit some of the same symptoms as the rotating eccentric weight vibrators, but perhaps not to the same degree. The mechanical structure of the linear vibrators may also result in their weights being displace when not actuated. In particular, when moved in or impacted in a direction that corresponds to the direction of linear displacement of the linear vibrator, displacement of the weight may occur and a user may sense the displacement. In some cases, the sensed displacement may feel spongy and/or detract from a user's impression of quality of the device in which the linear vibrator is implemented.

SUMMARY

One embodiment may take the form of a portable electronic device having at least one haptic actuator and a processor coupled to haptic actuator configured to control the operation of the at least one haptic actuator. Additionally, the device includes one or more sensors configured to sense movement of the device. The processor is configured to determine if movement of the device is attributable to actuation of the haptic actuator and implement mitigation routines to reduce the movement if the movement is attributable to actuation of the haptic actuator. Further, the device includes at least one acoustic sensor. The processor is configured to determine if actuation of the haptic actuator generates sound at a level that exceeds a threshold and, if so, control the operation of the haptic actuator to reduce the sound to a level below the threshold.

Another embodiment may take the form of a method of reducing noise from vibration of a device on a hard surface. The method includes activating a haptic device to indicate an alert and sensing an audible level during activation of the haptic device. Additionally, the method includes determining if the audible level exceeds a threshold and initiating mitigation routines to reduce the audible level to a level below the threshold if the threshold is exceeded.

Yet another embodiment may take the form of a method of mitigating locomotion of a device due to haptic devices. The method includes activating a haptic device and sensing movement of the device when the haptic device is activated. Moreover, the method includes determining if the movement is due to the haptic device activation and initiating mitigation routines to reduce the movement of the device due to activation of the haptic device.

Still another embodiment may take the form of a method of reducing reverberation of a linear vibrator in an electronic device. The method includes sensing movement of the linear vibrator and determining if the linear vibrator is activated. If the linear vibrator is not activated, the method also includes providing feedback signals to a feedback control system. The feedback signals reduce the movement of the linear vibrator.

Yet another embodiment may take the form of a method of reducing reverberation of a linear vibrator in an electronic device. The method includes sensing movement of the device using a sensor of the electronic device and generating a feedback signal based on the sensed movement. The feedback signal is provided via a feedback control system to the linear vibrator reduce the movement of the linear vibrator.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Embodiments discussed herein relate to operation of haptic devices in portable electronic devices. In particular, devices and techniques to limiting noise generated by the operation of haptic devices are provided. Moreover, some embodiments are directed to limiting movement of an electronic device when haptics are operating. Further, undesirable movement of the haptic devices is limited by monitoring and providing feedback to haptic devices.

Figure 1:
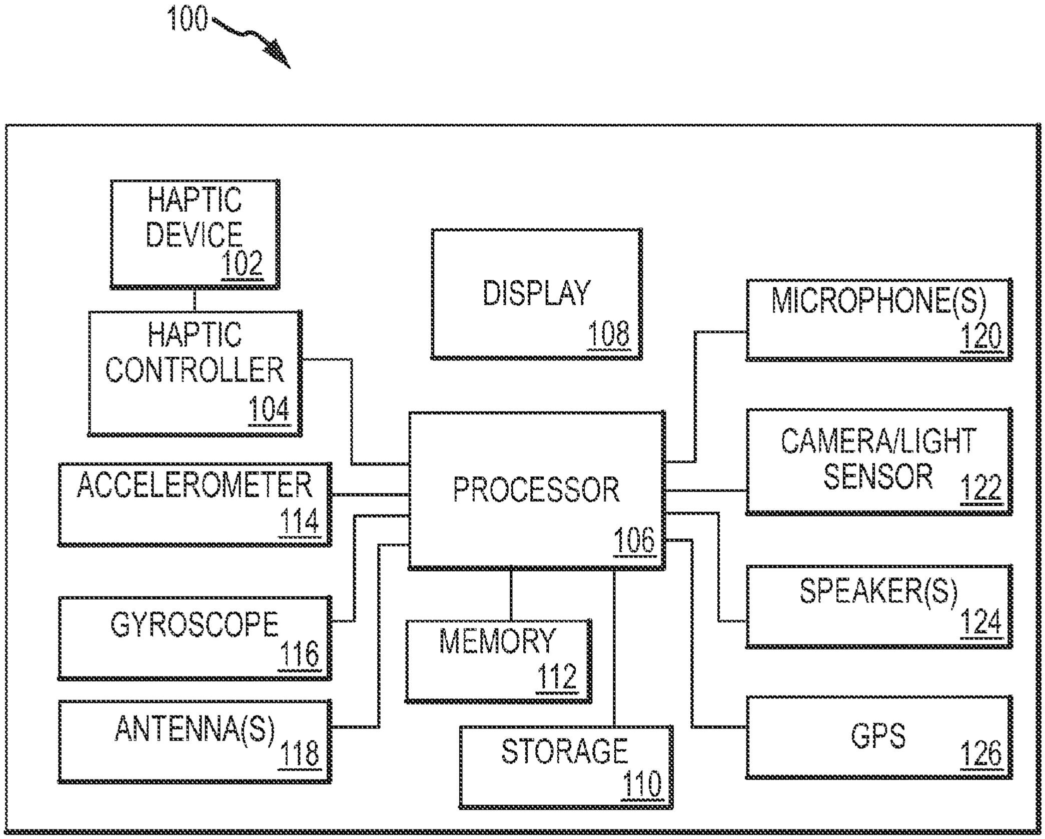
FIG. 1 is a block diagram illustrating an electronic device having haptic device.

FIG. 1 illustrates a block diagram of an electronic device 100 having a haptic device 102. The haptic device 102 may take the form of a vibrating device, such as a rotating vibrator, linear vibrator, or the like. The haptic device 102 may be controlled by a haptic controller 104. The haptic controller 104 may be implemented in hardware, software or a combination of both and may be configured to actuate the haptic device 102 to alert a user of the occurrence of an event, such as incoming call or a calendar item, for example. Additionally, in some embodiments, the haptic controller 104 may be part of a feedback control system configured to implement mitigation techniques to reduce possibly disruptive operation of the haptic device 102, as discussed in greater detail below.

The haptic controller 104 may be in communication with a processor 106. In some embodiments, the processor 106 may function as the haptic controller. The processor 106 may additionally be communicatively coupled to a display 108, a data storage device 110 and a memory device 112. Generally, the storage device 110 may take the form of one or more storage technologies such as flash memory, magnetic disk drives, magnetic tape drives, optical drives, and so forth. The memory device 112 may be implemented in any form of digital random access memory (RAM) including dynamic RAM, synchronous dynamic RAM, and so forth. Generally, the storage device 110 may store operating instructions that are executable by the processor 106 to provide certain functionality, such as determining if the haptic device 102 is making noise, if the device 100 is moving, and/or if the haptic device is displaced without being actuated. Further, the processor 106 may be configured to implement/execute mitigation routines (e.g., programmed software routines) stored in the storage device 110 to reduce or eliminate the aforementioned effects.

The processor 106 may further be communicatively coupled with one or more input/output (I/O) devices, such as an accelerometer 114, a gyroscope 116, an antenna 118, a microphone 120, a camera or light sensor 122, a speaker 124 and/or a global positioning system 126. The processor 106 may utilize one or more of the I/O devices to determine when the mobile device 100 is making noise or moving when the haptic device 102 is actuated and/or to help mitigate the effects of the actuation of the haptic device.

For example, in one embodiment, the microphone 120 may be activated concurrently with the haptic device 102 to determine if actuation of the haptic device creates noise and/or the accelerometer 114 and gyroscope 116 may be used to determine if the mobile device 100 is moving when the haptic device is actuated. With respect the actuation of the haptic device 102 creating noise, the noise generated may generally have a particular frequency and/or amplitude range that may help facilitate the determination by the processor that the noise is coming from the actuation of the haptic device rather than another source. Similarly, movement of the mobile device resulting from the actuation of the haptic device 102 may be distinguished from other movements based on the size, speed and direction of the movement as detected by the accelerometer 114 and gyroscope 116.

Figure 2:
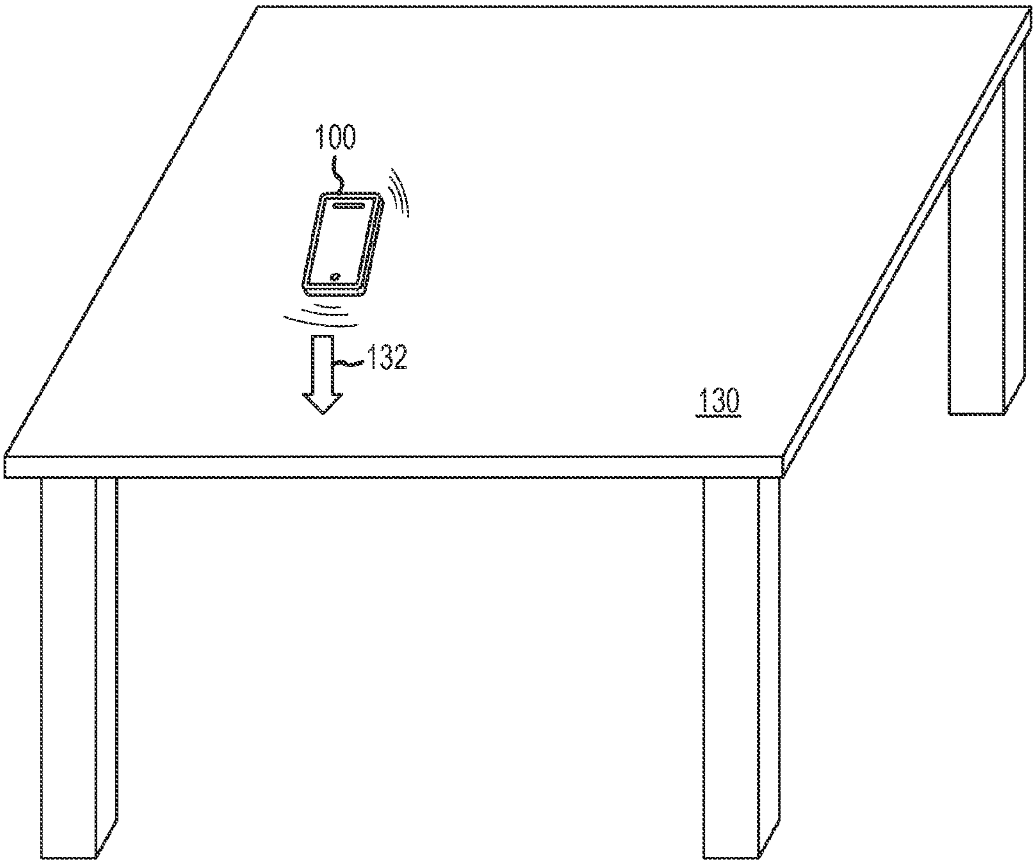
FIG. 2 illustrates the electronic device of FIG. 1 vibrating on a hard surface.

FIG. 2 illustrates the mobile device 100 on a hard surface, such as a table 130. When the haptic device 102 is actuated, the mobile device 100 may rattle on the table 130 and generate noise. Further, the haptic device 102 may cause the device 100 to move across the table 130, as indicated by the arrow 132.

Figure 3:
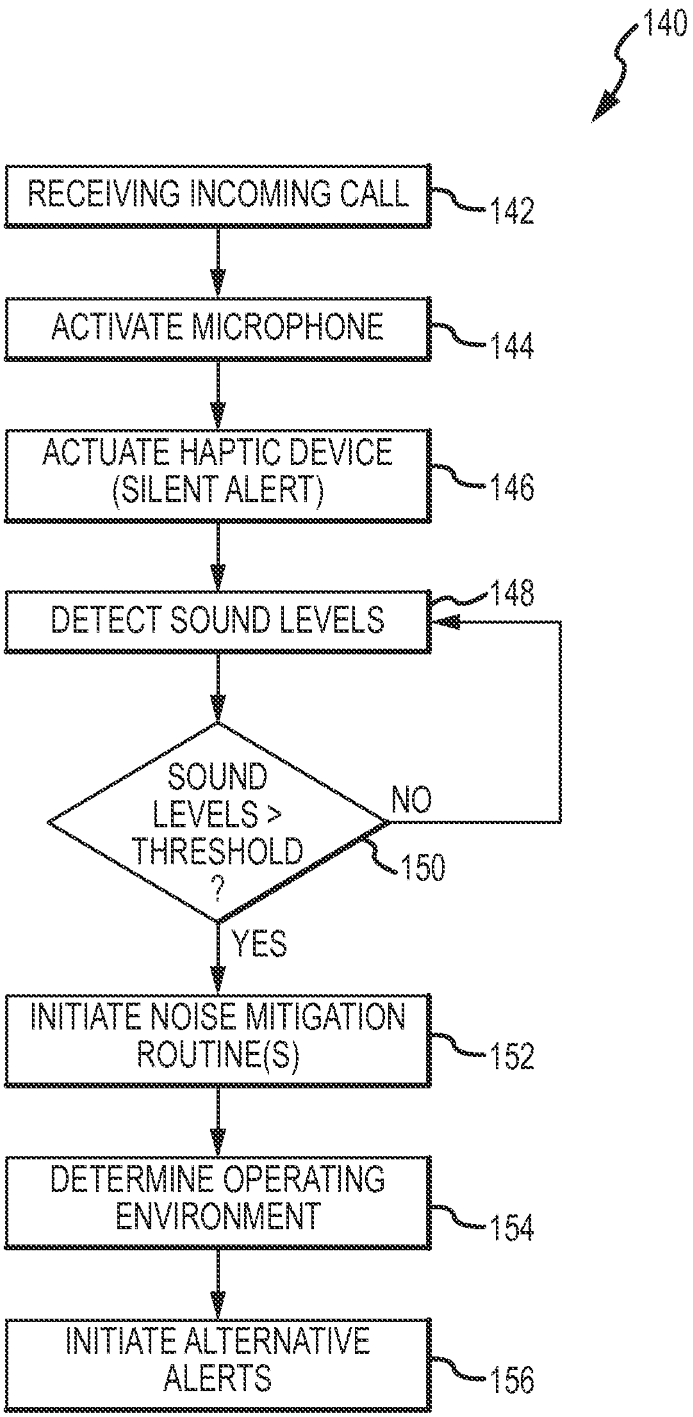
FIG. 3 is a flowchart illustrating a method for reducing noise generated by actuation of the haptic device of the electronic device of FIG. 1.

FIG. 3 is a flow chart illustrating an example method 140 for reducing the noise generated by actuation of the haptic device 102. Initially, an incoming call may be received (Block 142) and the microphone 120 may be activated (Block 144). The haptic device 102 is activated (Block 146) while the microphone is active. In one embodiment, the microphone 120 may be activated before the haptic device 102 to allow the microphone to sample sound/noise prior to actuation of the haptic device. This sample may serve as a baseline with which sound/noise samples taken while the haptic device is actuated may be compared. It should be appreciated that in other embodiments, the microphone 120 may be activated simultaneously with the actuation of the haptic device or after actuation of the haptic device. Generally, the noise generated from operation of the haptic device should have a distinct frequency pattern. For example, in some embodiments, the sound generated by haptic operation may be between approximately 300 Hz and 400 Hz. As such, this frequency band (or other frequency band within which the haptic device generates noise) may be determinative of the noise generated by the haptic device and an amplitude (and/or total power) of signals within this range may be used for noise determination.

Regardless of when the microphone is initially activated, sound levels are detected (Block 148). The detected sound levels may be compared with one or more thresholds (Block 150). In one embodiment, a threshold may be a noise level that can be expected when the haptic device is actuated if the mobile device is not on a hard surface. As such, the threshold may be empirically determined. For example, a first threshold may be set at a level of a minimum noise level expected when the device is located on a hard surface as determined through experimentation. If the sound levels do not exceed the threshold (e.g., do not indicate that the mobile device 100 is making noise by rattling against a hard surface) the sound levels may continue to be detected while the haptic device is actuated.

In still other embodiments, the threshold level may be configured to correspond with a volume level for an audible alert. That is, if actuation of the haptic device generates noise that exceeds the noise level of an audible alert, the threshold has been exceeded. Hence, the threshold may be user configurable based on the volume setting for audible alerts. In other embodiments, the threshold may be set to a default noise level of audible alerts.

Some embodiments may implement multiple thresholds. For example a first threshold may be set to a minimum noise level that is expected if the device is located on a hard surface and a second threshold may be set to correspond to a volume setting for an audible alert. The multiple thresholds may provide for implementation of different mitigation routines depending on what threshold(s) are exceeded.

If the sound levels exceed the threshold, noise mitigation routines may be initiated (Block 152). The noise mitigation routines may include software routines that control the operation of the haptic device 102. For example, the noise mitigation routines may slow, stop, pulse, and/or ramp up/ramp down the speed of the haptic device 102. In one embodiment, the mobile device 100 may be configured to determine a speed/frequency for the haptic device 102 that is variable and configured to eliminate periodic elements of the rattling of the device. That is, for example, a rotational vibrator be configured to rotate a frequency destructive to the periodic rattling of the mobile device 100. In some embodiments, the vibrator may be slowed, pulsed, or even stopped to eliminate the rattling of the device and the associated noise.

Once noise mitigation routines have been initiated, an operating environment may be determined (Block 154). For example, the light sensor 122 may be used to determine if the device 100 is in a darkened room or a lighted room. Additionally, the GPS 126 may be used to determine if the device is in a home, office, or other location, for example. Based on the environmental information, alternative alerts may be initiated (Block 156). For example, visual and/or audible alerts may be initiated, such as a light may flash, the display 108 may turn on, and/or an audible alert may be sounded.

Figure 4:
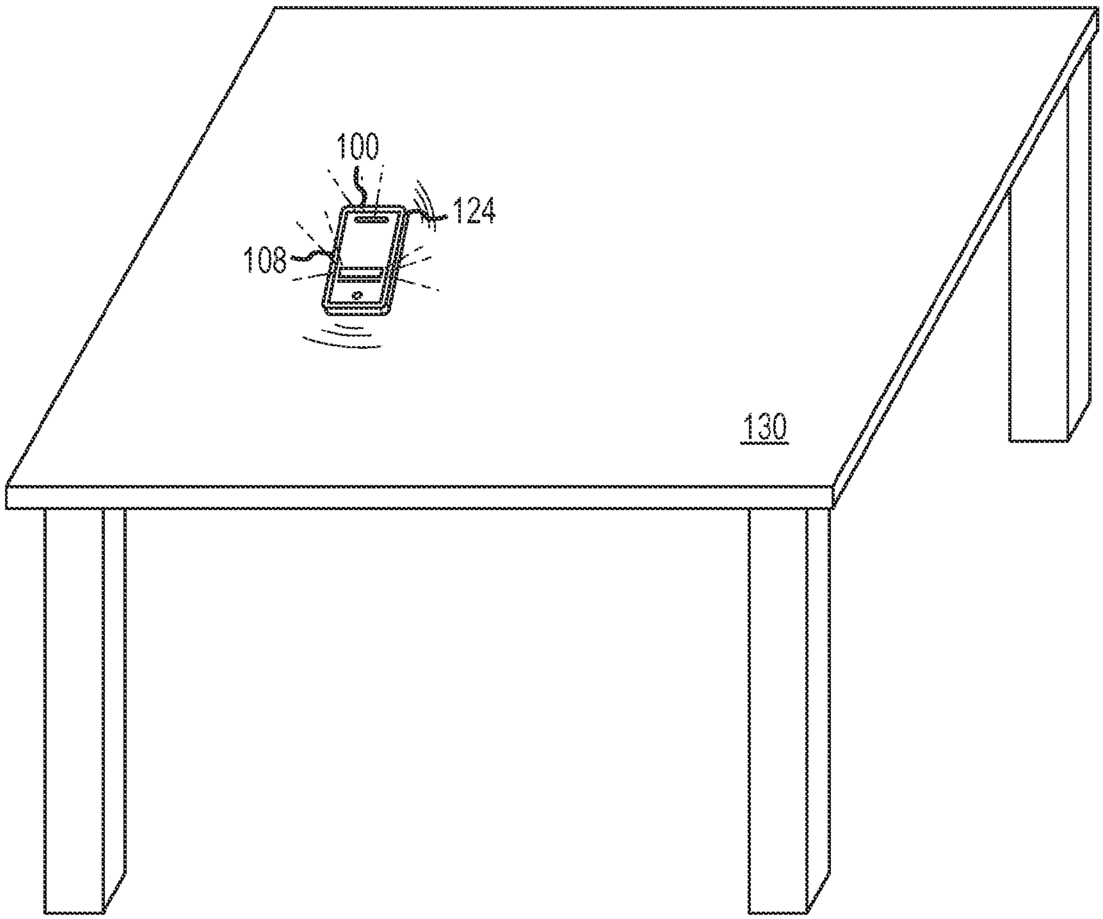
FIG. 4 illustrates the electronic device of FIG. 1 with visual and audible alerts activated in lieu of a haptic alert.

FIG. 4 illustrates the initiation of alternative alerts for the device 100. Specifically, for example, the display 108 may turn on to provide a visual alert. Additionally or alternatively, the speaker 124 may sound an audible alert. As may be appreciated, the audible alert may be quieter and more discrete than the haptic alert. Moreover, the audible alert that is used to replace the haptic alert may be different from those that are typically used. For example, the audible alert may be configured to mimic the sound that the haptic alert makes when the device is not in contact with a hard surface (e.g., a low rumble). Other types of alerts may be implemented in other embodiments.

Figure 5:
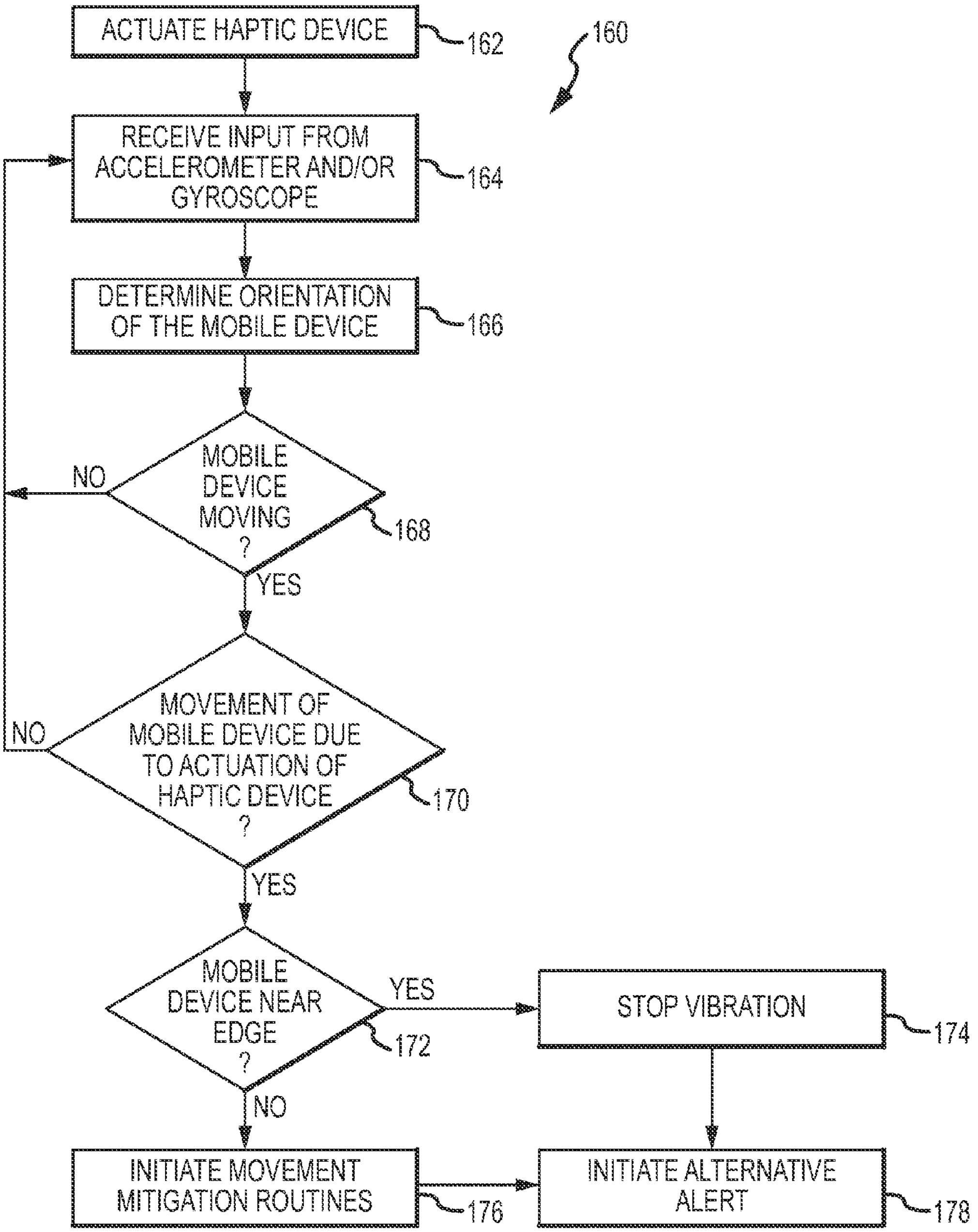
FIG. 5 is a flowchart illustrating a method of mitigating haptic device induced movement of the device.

As mentioned above, in some cases, the vibration of the device 100 may cause the device to move. This movement of the device 100 may be exaggerated if the surface upon which the device is located is not level. FIG. 5 is a flowchart illustrating a method 160 for stopping the movement of the device 100. Initially, the haptic device 102 may be actuated (Block 162) for example as a result of an incoming call. Upon actuation of the haptic device 102, input from the accelerometer 114 and/or the gyroscope may be received (Block 164). In some embodiments, an orientation of the device 100 may be determined (Block 166). The orientation of the device may help determine if the device is on a table, desk, shelf and so forth, or in a pocket. That is, if the device 100 is lying flat, it is likely that it is on a table, desk, shelf, or the like, whereas if the device is in an upright position, it is likely in a pocket or being held. The input from the accelerometer 114 and/or gyroscope 116 may be used for orientation determination. Further, input from the accelerometer and/or gyroscope 116 may be used for determining if the device 100 is moving (Block 168).

If the device 100 is not moving, while the haptic device 102 is actuated it may continue to monitor the input from the accelerometer 114 and/or gyroscope to determine if there is movement. If it is determined that there is movement of the mobile device, it is determined if the movement is due to the haptic device being actuated (Block 170). For example, in some instances, the haptic device may actuate while a user of the device 100 is moving, rather than the movement resulting from the haptic actuation. Movement by a user may be distinguished from haptic induced movement in a number or different ways. In particular, a movement that was occurring before actuation of the haptic device likely would be attributable to a user (or other source) rather than the haptic actuation. Additionally, gross movements, such as when a mobile device is picked-up by a user would generally indicate user caused movement, rather than smaller, quicker movement that may be periodic may likely be characterized as those caused by the haptic actuation. Further, migration movement (e.g., continuous movement in a general direction) that imitates upon actuation of the haptic device may be characterized as being from the haptic actuation.

In some embodiments, movement thresholds may be utilized to determine if the movement is haptic based. For example, movements less than six inches (e.g., movement of three, two or one inch) may indicate that the movement is likely attributable to haptic actuation. Moreover, thresholds may be utilized to determine if the movement should be stopped. For example, if the device moves an inch or more due to actuation of the haptic it mitigation may be in order. In some embodiments, if the device does not move at least a threshold distance due to the actuation of the haptic device, mitigation routines may not be implemented.

Figure 6:
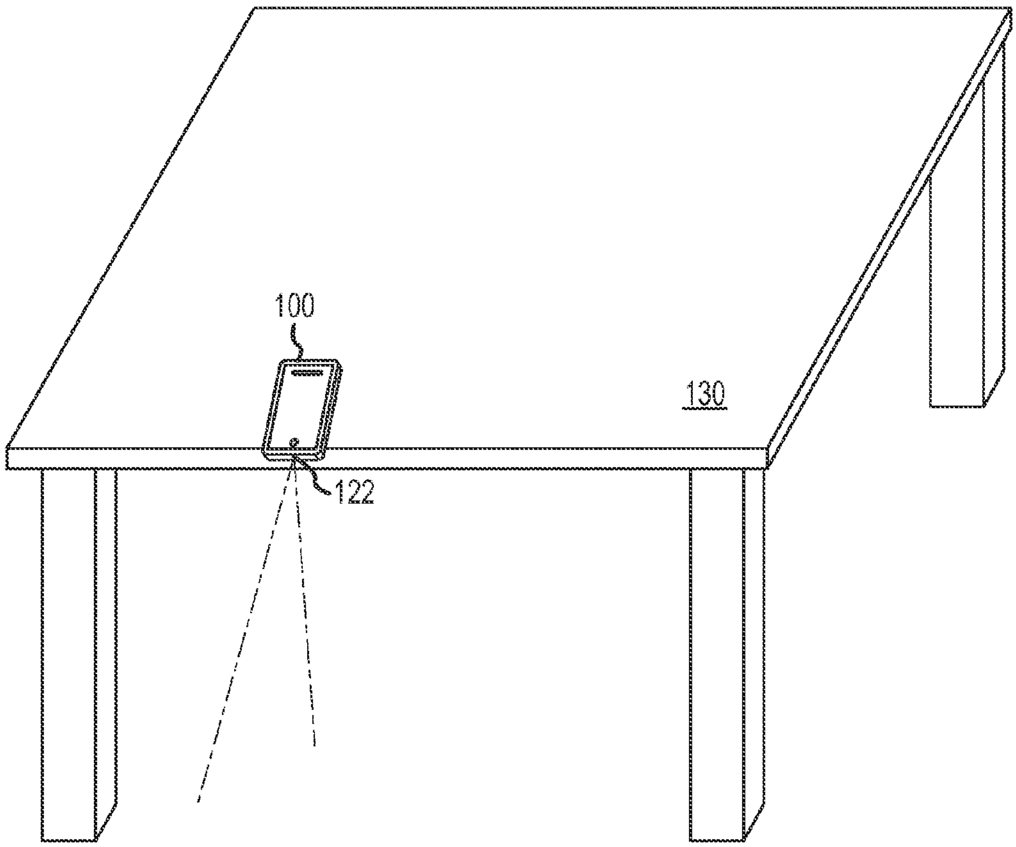
FIG. 6 illustrates the electronic device of FIG. 1 determining that it is near an edge.
Figure 7:
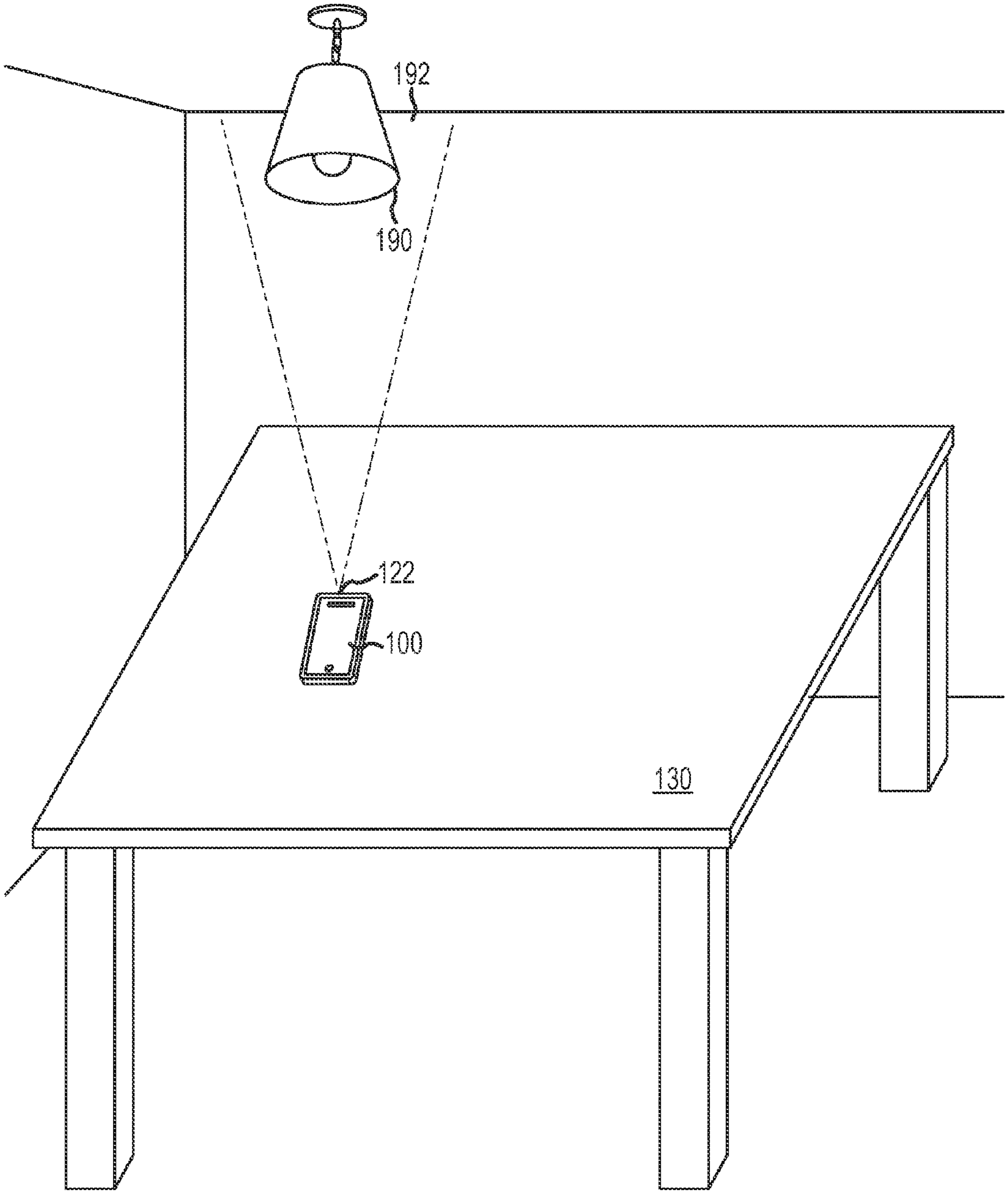
FIG. 7 illustrates the electronic device of FIG. 1 utilizing edge features in its environment to aid in movement determination.

If the movement is not caused by actuation of the haptic device 102, the input from the accelerometer and/or gyroscope may continue to be monitored for further movements that may be caused by the haptic actuation. If it is determined that the movements are a result of the haptic actuation, it may then be determined if the device is near an edge (Block 172). The determination as to whether the device 100 is near an edge may be implemented in one or more of a number of ways. For example, while the device is on a surface a light sensor of the device 100 adjacent to the surface may register little or no light until a portion of the device extends over the edge of the surface. In other embodiments, the camera of the device may be used in a similar manner as an edge detection device as shown in FIG. 6. In still other embodiments, a microphone may be utilized in a similar manner.

If the device 100 is determined to be near an edge, the haptic device may be stopped (Block 174) and alternative alerts may be initiated (Block 178). Additionally, in some embodiments, an edge alert may be initiated as part of the alternative alerts to alert the user to the position of the device. If the mobile device is not near an edge, movement mitigation routines may be implemented (Block 176) and alternative alerts may be initiated (Block 178). The alternative alerts may include those discussed above, as well as others.

The movement mitigation routines may include processes configured to reduce and/or eliminate migration of the device 100 as a result of actuation of the haptic device 102. In some embodiments, the movement mitigation routines may include reducing the speed of the haptic device, slowly ramping up and then stopping or ramping down the haptic device, and so forth. In one embodiment, in particular, the haptic device may alternate its direction of rotation. As such, the device 100 may initially move in a first direction due to the rotation of the haptic device and then alternately move in a second direction opposite of the first direction due to the reverse rotation of the haptic device, thus resulting in a net zero movement of the device. In some embodiments, the haptic device may alternate pulsing in each direction.

Although movement of the device 100 may be determined based on input from the accelerometer 114 and/or gyroscope 116. Input from other devices may also be utilized to determine if the device 100 is moving. For example, the GPS device 126 may be used to determine if the device is moving while the haptic device 102 is actuated. Additionally, in one embodiment, input from the camera 122 may be used to determine if the device 100 is moving. In particular, the camera may capture multiple images while the haptic device 102 is actuated. Edges of items in the captured images may be discerned by edge detection software. Movement of the edges of the items in captured images may serve as an indication of movement of the device. Specifically, if one or more edges are found in the images (e.g., an edge of a light 190, a corner of a wall 192, and so forth), and the edges move greater than a threshold distance within a specified amount of time, it may be determined that the device is moving. In some embodiments, the threshold distance may be approximately a distance equal to normal shaking of the device due to actuation of the haptic device 102. Further, the period of time may be some segment of time less than a full "ring" of the haptic device (e.g., ½, ⅓, ¼, or 1/10 of a full ring cycle for the haptic device).

Furthermore, in some embodiments, the device 100 may be configured to implement location based learning. For example, a GPS device may be utilized to determine the location of the device 100 and information about that location may be stored in the device. Specifically, a first time the device is in a particular location it may make determinations as to whether it is on a hard surface such as a table, desk, shelf, and so on. If so, the next time it is placed in that location it may remember it and act accordingly. That is, if it is on a hard surface where it is at risk of moving and or making excessive noise if a haptic device is actuated, then the mitigation routines may be implemented including pulsing the haptic device, ramping up the operation of the haptic device, and/or replacing the haptic alert with a visual or audible alert.

Figure 8:
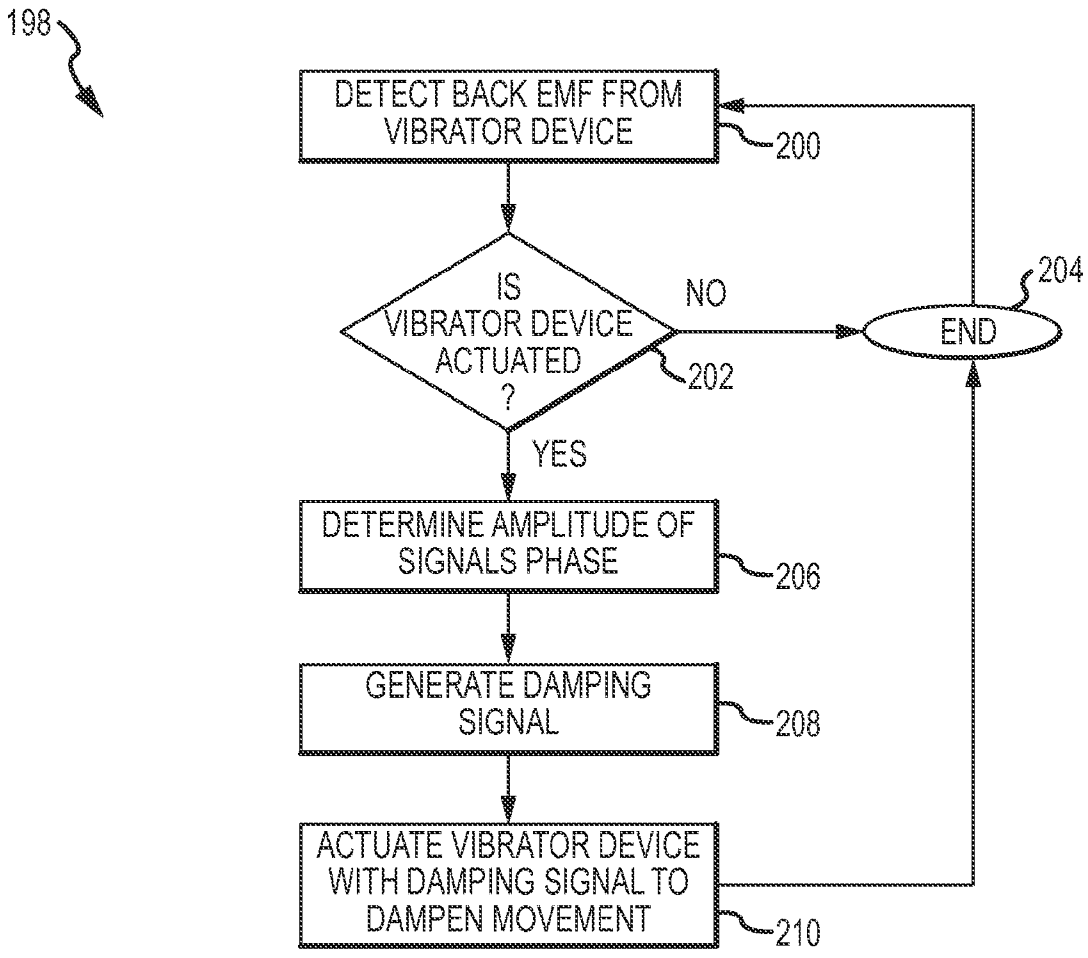
FIG. 8 is a flowchart illustrating a method of mitigating movement of a linear vibrator when the linear vibrator is not actuated.

In linear vibrators and similar devices, movement of the mobile device may cause movement or oscillation of the weight of the vibrator. In particular, if the device is tapped by a user in a direction that corresponds to the direction that the weight displaces when the vibrator operates it may provide feedback to the user that feels spongy. FIG. 8 is a flowchart illustrating a method of actively controlling the vibrator to help reduce or eliminate this feedback. Initially, for example, back electromagnetic force (EMF) from the vibrator device may be detected (Block 200). This EMF may generally be induced by movement of a magnet of the linear vibrator generated by displacement of the weight of the vibrator. In other embodiments, other sensors may be utilized to determine movement of the linear vibrator. For example, an accelerometer may be implemented for sensing movement of the linear vibrator.

When this EMF (or movement) is detected, it is determined if the vibrator device is actuated (Block 202). This determination may simply include determining if an alert for an incoming call, calendar item, or the like has issued.

If the vibrator device has been actuated, then the method 198 ends (Block 204). If the vibrator device has not be actuated, then the amplitude and phase of the EMF signals is determined (Block 206). This amplitude and phase of the EMF signal is used to generate a damping signal (Block 208). Specifically, the damping signal corresponds in amplitude and is out of phase with the detected phase signal. The vibrator device is then actuated with the damping signal to dampen and/or stop the movement of the vibrator (Block 210).

In another embodiment, an open-loop feedback system may be implemented to dampen the undesired vibrations of the linear vibrator. Specifically, vibrations/impacts, such as tapping on the device, may be sensed and a feedback signal generated based on the sensed vibrations/impacts. In one embodiment, an accelerometer may be used to sense the movement of the entire device, detecting both amplitude and direction of the movement of the device. The feedback signal corresponds with the movement and is provided to the linear vibrator to preempt/reduce/eliminate any vibrations in the linear vibrator caused by the sensed impact. Hence, rather than utilizing reverberations sensed from the linear vibrator to generate a feedback signal, readings from a separate sensor are utilized.

The foregoing describes some example embodiments for controlling haptic devices so that they do not generate excessive noise or move when actuated. Although the foregoing discussion has presented specific embodiments, persons skilled in the art will recognize that changes may be made in form and detail without departing from the spirit and scope of the embodiments. For example, in addition to noise level, accelerometer and gyroscopes sensing vibration of the device, a camera or light sensor may also be used to sense vibration. Specifically, if the camera is face down against a surface it will generally detect little or no light, but if the device is vibrating the level of light will increase. The increase in light detected may be used to indicate vibration. Accordingly, the specific embodiments described herein should be understood as examples and not limiting the scope thereof.

The invention claimed is:

1. A method of mitigating locomotion of a device due to a haptic devices, the method comprising:
- activating the haptic device;
- sensing movement of the device when the haptic device is activated;
- determining, using a processor, if the device's movement corresponds to a movement of the device across a surface due to the haptic device activation by determining if the movement exceeds a threshold distance; and
- initiating a mitigation routine that reduces the movement of the device due to activation of the haptic device.

2. The method of claim 1 further comprising:
- determining if the device's movement is due to the haptic device activation;
- determining if the movement exceeds a threshold; and
- only initiating mitigation routines if the threshold is exceeded.

3. The method of claim 1 further comprising:
- determining an orientation of the device; and
- based on the orientation determination, determining if the device is at risk of locomotion.

4. The method of claim 1 further comprising:
- determining if the device is near an edge and
- stopping the haptic device if the device is near the edge.

5. The method of claim 4 further comprising activating an edge alert if the device is near the edge.

6. The method of claim 1 wherein the mitigation routine comprises at least one of:
- stopping the haptic device;
- slowing the haptic device;
- ramping up the haptic device; and
- reversing direction of operation for the haptic device.

7. The method of claim 1 further comprising actuating at least one of a visual or audible alert if the movement is due to actuation of the haptic device.

8. A portable electronic device comprising:
- a haptic actuator;
- a processor coupled to the haptic actuator, the processor configured to control the operation of the haptic actuator;
- one or more sensors configured to sense movement of the device, wherein the processor is configured to determine if movement of the device exceeds a threshold distance and is attributable to actuation of the haptic actuator, wherein the processor is further configured to implement a mitigation routine to reduce the movement based on the determination; and
- at least one acoustic sensor, wherein the processor is configured to determine if actuation of the haptic actuator generates sound at a level that exceeds a threshold and, if so, control the operation of the haptic actuator to reduce the sound to a level below the threshold.

9. The device of claim 8 wherein the one or more sensors comprises one or more of:
- an accelerometer, a gyroscope, a GPS, and a camera.

10. The device of claim 8 further comprising a haptic controller configured to control the operation of the haptic actuator.

11. A method of mitigating of a device due to an actuation of a haptic device, the method comprising:

initiating an alert which activates the haptic device;

sensing movement of the device when the haptic device is activated;

determining, using a processor, if the device's movement corresponds to a movement of the device across a surface due to the haptic device activation by determining if the movement exceeds a threshold distance; and initiating an alternative alert to reduce the movement of the device, wherein the alternative alert does not activate the haptic device.

12. The method of claim 11 wherein the alternative alert includes a visual alert produced using one or more of: a light and a display.

13. The method of claim 11 wherein the alternative alert includes an audible alert produced using a speaker.

14. The method of claim 13 wherein the audible alert is configured to mimic the sound of a haptic actuation.

* * * * *